(12) United States Patent
Todo

(10) Patent No.: US 11,931,666 B2
(45) Date of Patent: Mar. 19, 2024

(54) EXPRESSION-VARIABLE ROBOT

(71) Applicant: Takayuki Todo, Tokyo (JP)

(72) Inventor: Takayuki Todo, Tokyo (JP)

( * ) Notice: Subject to any disclaimer, the term of this patent is extended or adjusted under 35 U.S.C. 154(b) by 672 days.

(21) Appl. No.: 17/050,648

(22) PCT Filed: Apr. 25, 2019

(86) PCT No.: PCT/JP2019/017792
§ 371 (c)(1),
(2) Date: Oct. 26, 2020

(87) PCT Pub. No.: WO2019/208732
PCT Pub. Date: Oct. 31, 2019

(65) Prior Publication Data
US 2021/0093980 A1 Apr. 1, 2021

(30) Foreign Application Priority Data
Apr. 26, 2018 (JP) .................................. 2018-085351

(51) Int. Cl.
*A63H 3/36* (2006.01)
*B25J 11/00* (2006.01)

(52) U.S. Cl.
CPC ............ *A63H 3/365* (2013.01); *B25J 11/001* (2013.01)

(58) Field of Classification Search
CPC .......... A63H 3/365; A63H 3/445; A63H 3/48; B25J 11/001; B25J 11/0015
USPC ......................................... 446/330, 337, 342
See application file for complete search history.

(56) References Cited

U.S. PATENT DOCUMENTS

| 4,683,669 A * | 8/1987 | Greer, Jr. ............... | A63H 3/365 446/337 |
| 6,966,776 B1 * | 11/2005 | Jones .................... | G09B 21/009 446/337 |
| 6,991,511 B2 * | 1/2006 | Maggiore ................ | A63H 3/48 446/337 |
| 7,021,988 B2 * | 4/2006 | Patton .................. | A63H 13/005 446/337 |
| 7,234,988 B2 * | 6/2007 | Patton .................... | A63H 3/365 446/337 |
| 7,508,393 B2 * | 3/2009 | Gordon ................... | G06T 13/40 446/175 |
| 7,833,081 B2 * | 11/2010 | Hippely ............... | A63H 17/266 446/470 |
| 8,662,955 B1 * | 3/2014 | Fai ....................... | A63H 13/005 446/337 |

(Continued)

FOREIGN PATENT DOCUMENTS

JP         H08107983 A      4/1996

OTHER PUBLICATIONS

International Search Report dated Jul. 23, 2019 for International Patent Application No. PCT/JP2019/017792.

*Primary Examiner* — Alexander R Niconovich

(57) ABSTRACT

To provide an expression-variable robot capable of stably showing a variety of expressions by a simple configuration. An expression-variable robot includes a simulated face and an eyebrow body that is disposed on the surface of the simulated face, the eyebrow body having flexibility. The expression-variable robot further includes a first support part that supports an outer end of the eyebrow body, a second support part that supports an inner end of the eyebrow body, and drive parts that rotate the outer end.

5 Claims, 8 Drawing Sheets

(56) References Cited

U.S. PATENT DOCUMENTS

| | | | | |
|---|---|---|---|---|
| 8,888,553 | B2* | 11/2014 | McMullen | A63H 3/365 |
| | | | | 446/321 |
| 9,474,981 | B1* | 10/2016 | Forti | A63H 13/005 |
| 10,913,161 | B2* | 2/2021 | Jackson | B25J 11/0015 |
| 10,940,399 | B2* | 3/2021 | McMullen | A63H 3/003 |
| 11,170,667 | B2* | 11/2021 | Kirchhoff | G09B 23/34 |
| 2008/0050999 | A1* | 2/2008 | Jang | A63H 13/005 |
| | | | | 446/337 |
| 2019/0046890 | A1* | 2/2019 | Vaughn | B25J 11/0015 |
| 2021/0086090 | A1* | 3/2021 | Sardo | A63H 3/365 |
| 2022/0054941 | A1* | 2/2022 | Ciganko | A63F 13/79 |

\* cited by examiner

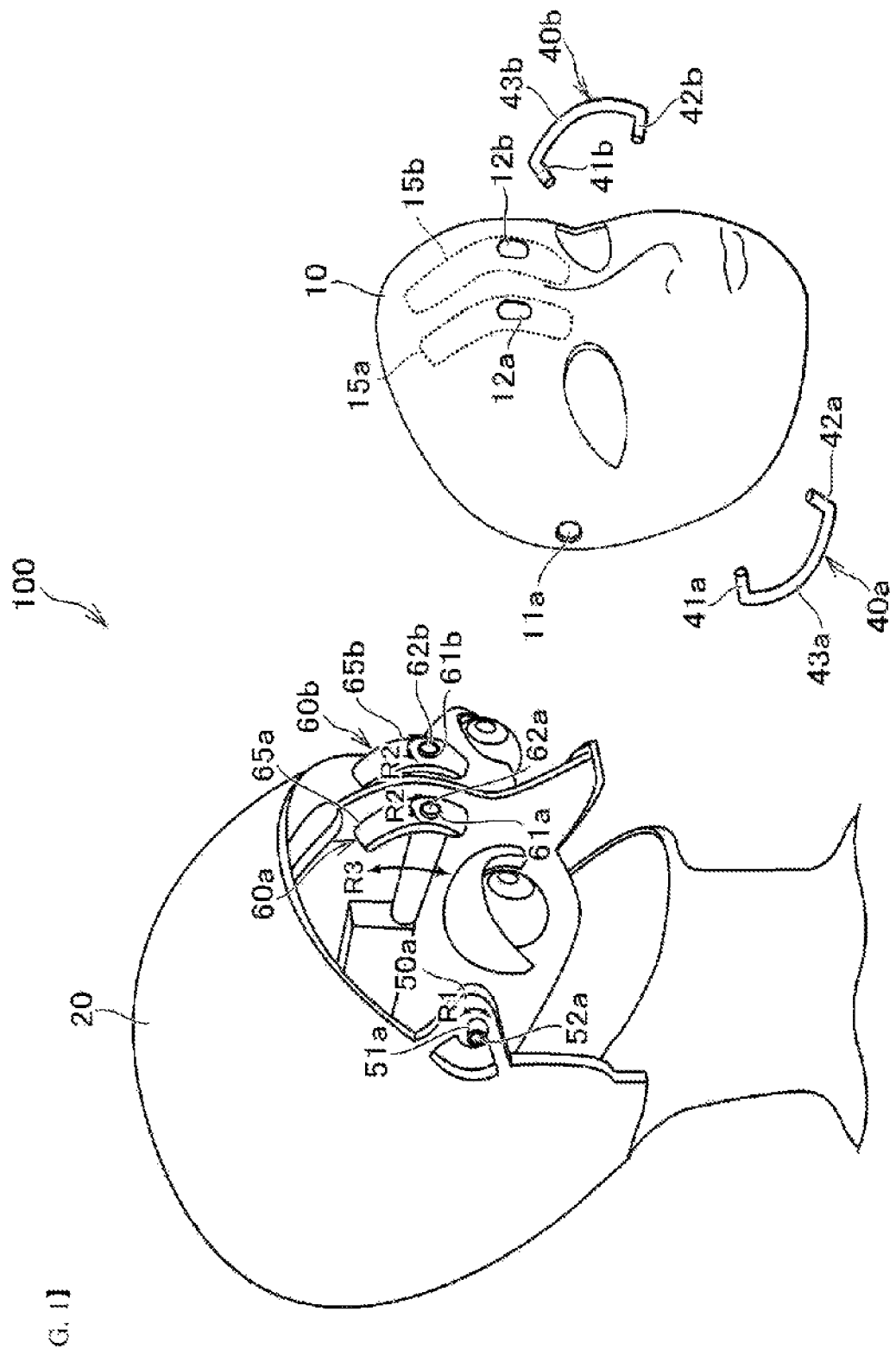
[FIG. 1]

[FIG. 2]
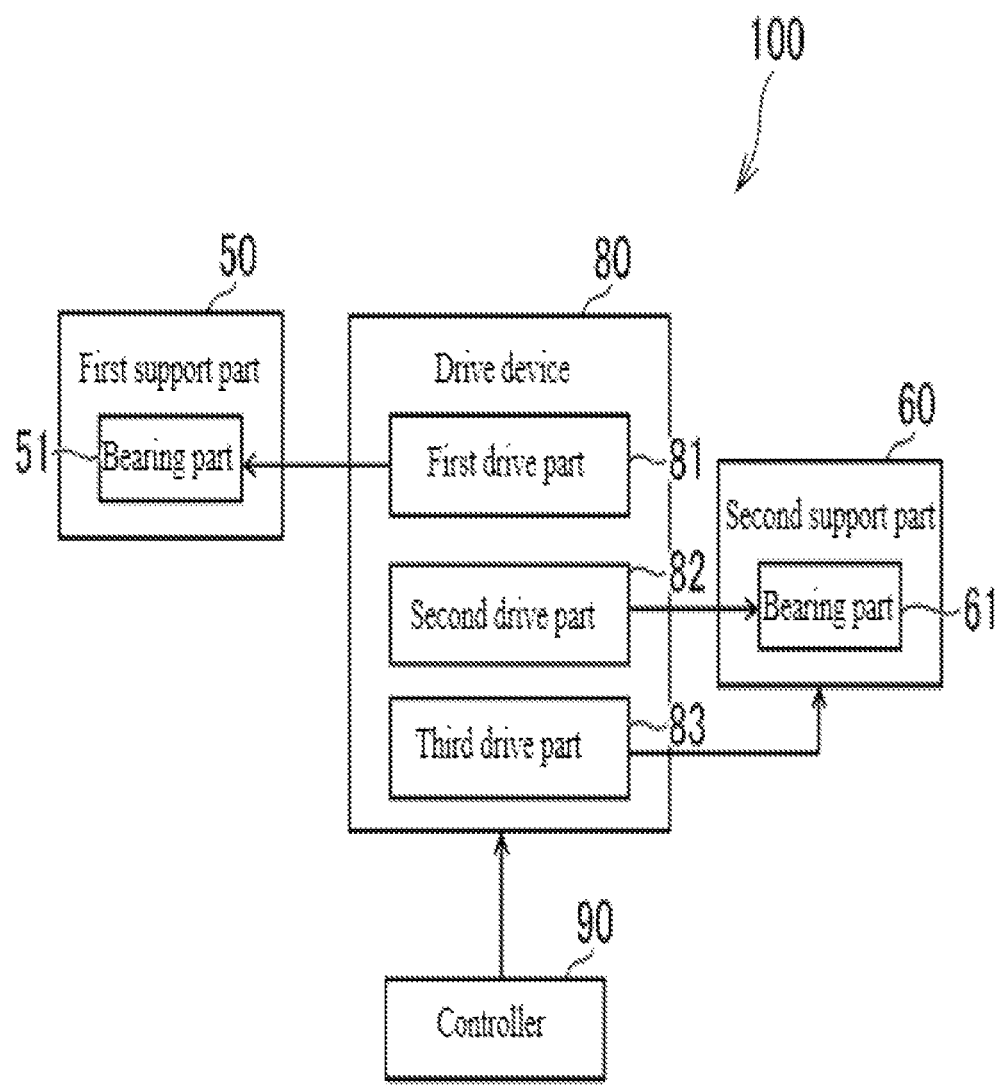

[FIG. 3]
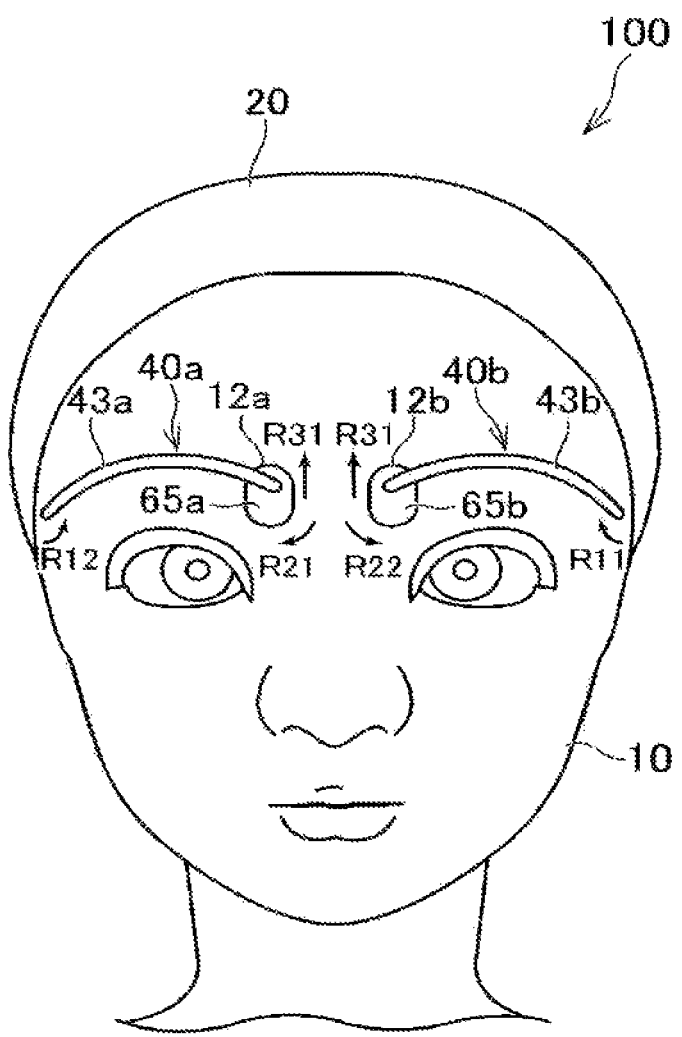

[FIG. 4]
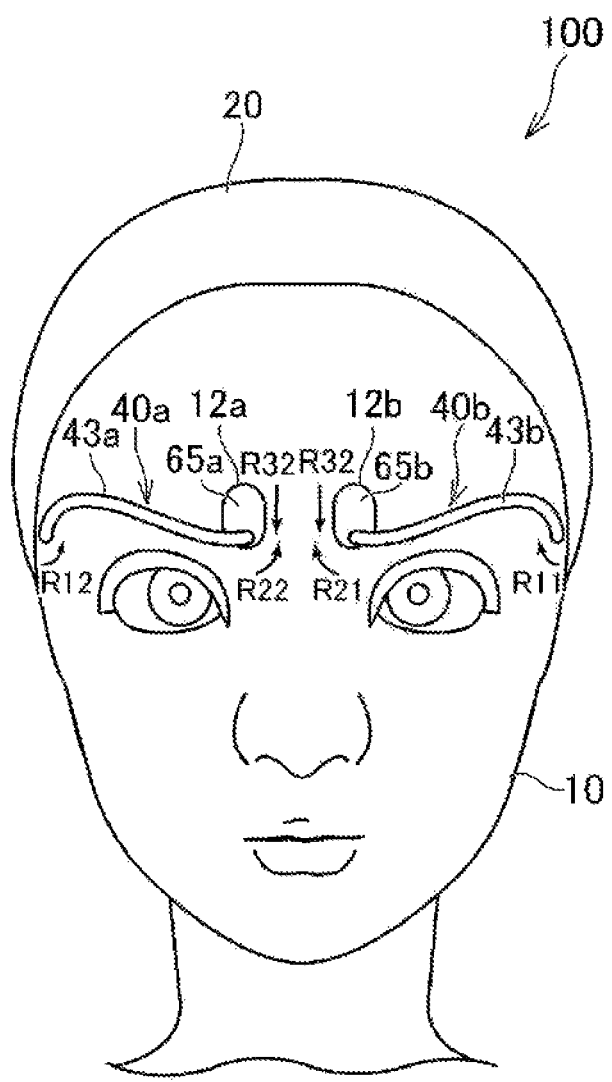

[FIG. 5]
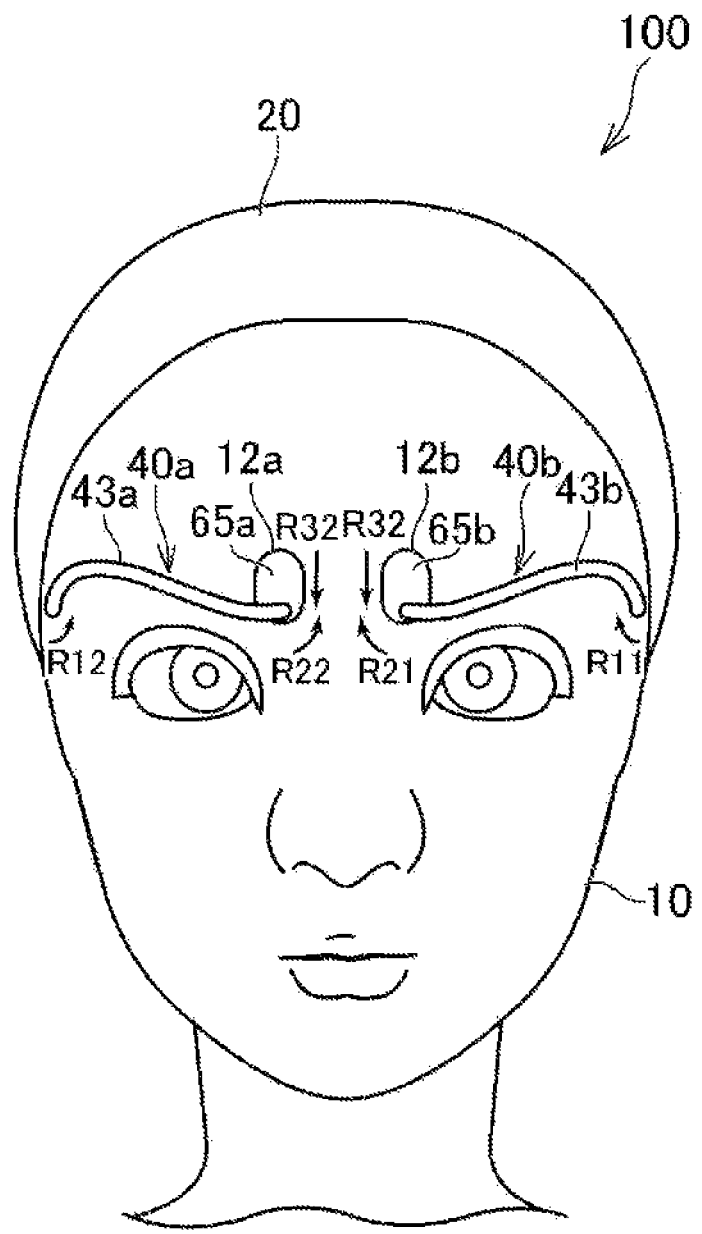

[FIG. 6]
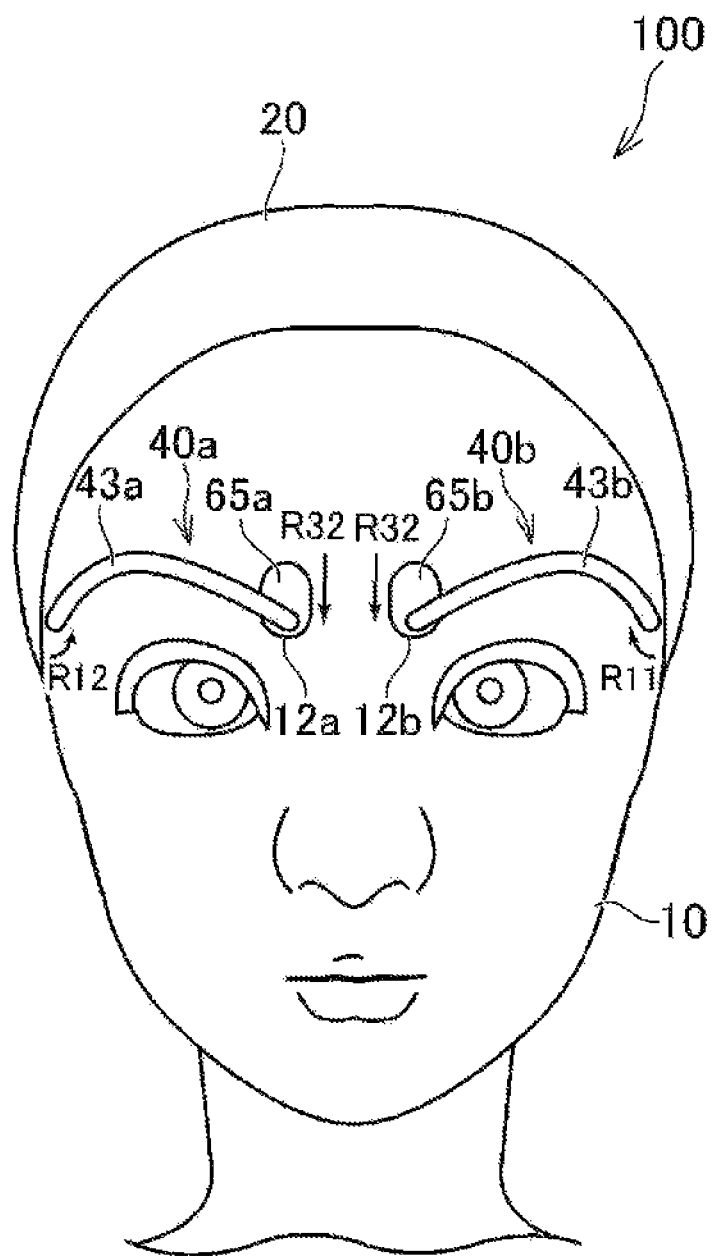

[FIG. 7]
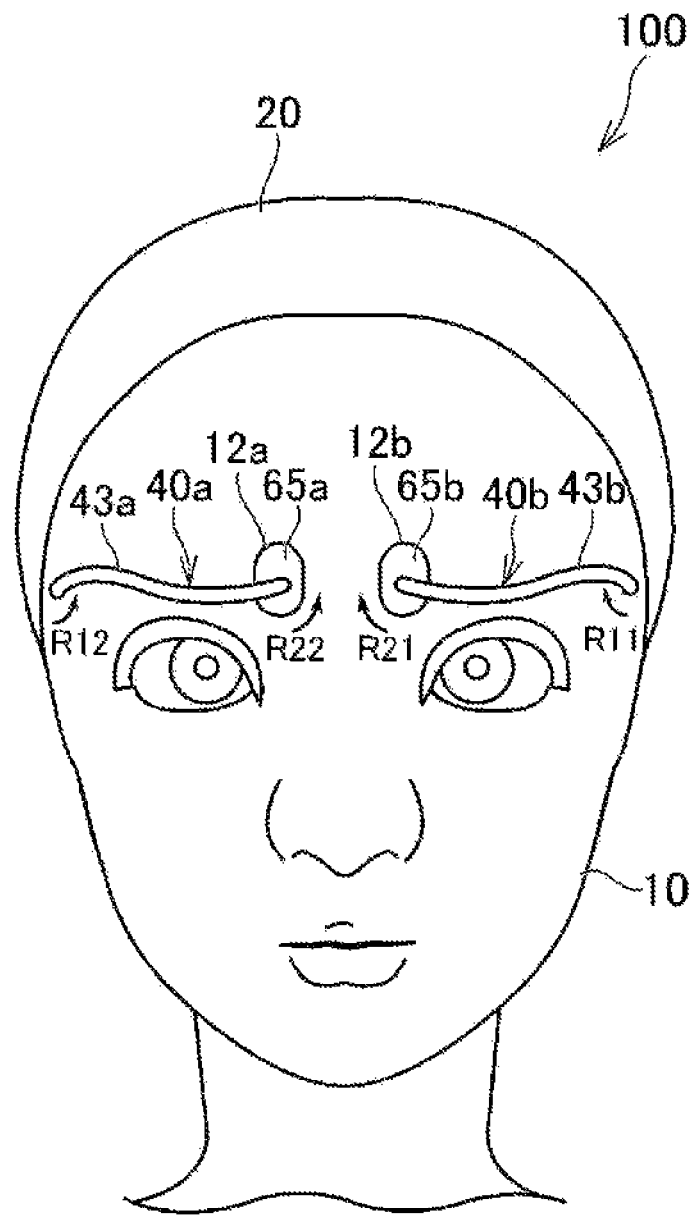

[FIG. 8]
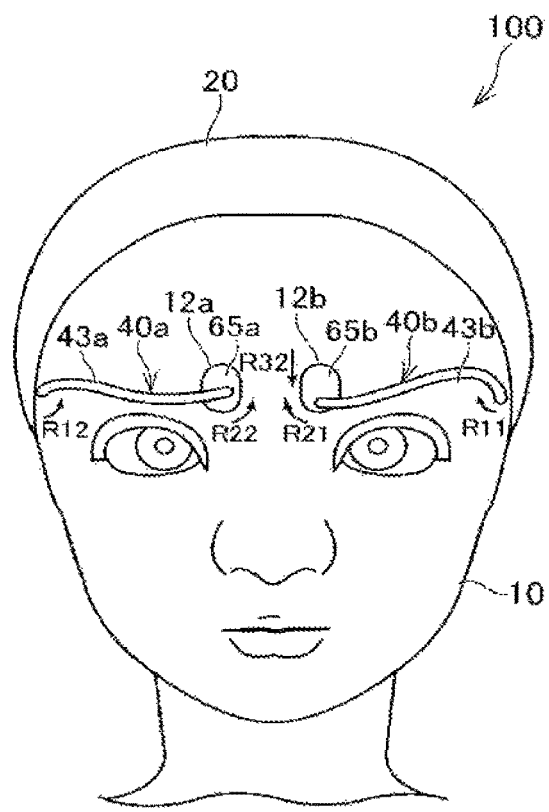
[FIG. 9]
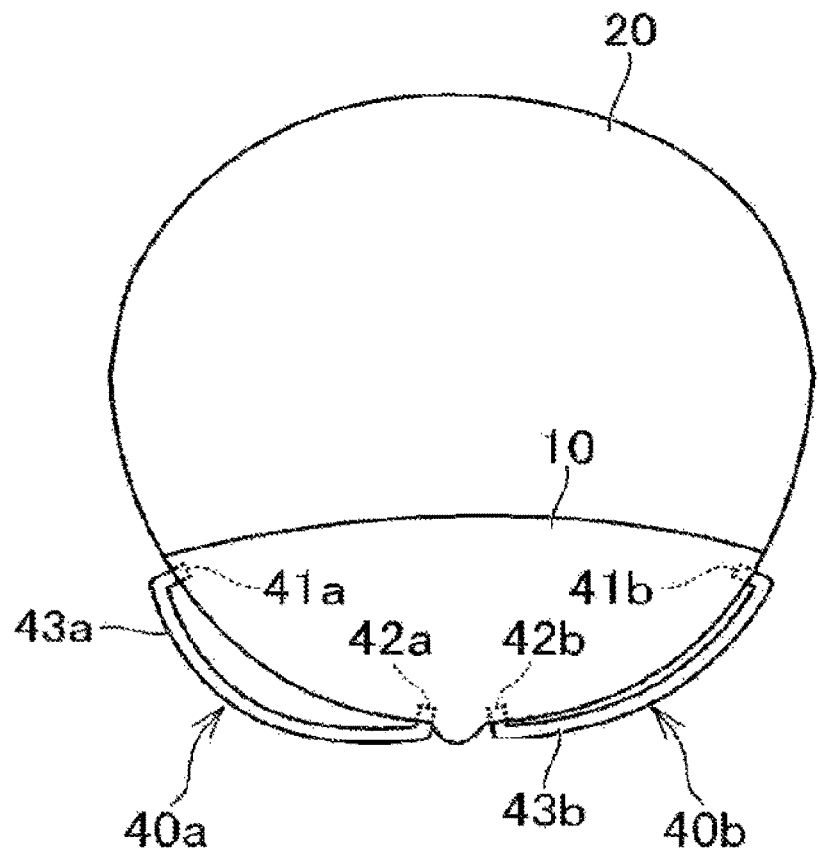

EXPRESSION-VARIABLE ROBOT

TECHNICAL FIELD

The present disclosure relates to an expression-variable robot.

BACKGROUND ART

In recent years, robots that act like human beings have been developed. In the robots, it is important to show various kinds of expressions in order to realize more human actions. For example, Patent document 1 discloses a device that changes the expression of a human being type robot or a doll by mounting a mask of a soft and rigid resin on the head of the robot or the doll and expanding and contracting the mask.

PRIOR DOCUMENT

Patent Document

Patent Document 1
Japanese Unexamined Patent Publication No. Hei 8-107983

SUMMARY OF THE INVENTION

Technical Problem

However, in the device for changing the face by expanding and contracting the soft mask as in Patent document 1, it is difficult to stably show an expression. Further, in order to show various kinds of expressions, a plurality of actuators and the like are necessary, and the structure of the device becomes complex.

In consideration of the problems, an object of the present disclosure is to provide an expression-variable robot capable of stably showing various kinds of expressions while having a simple configuration.

Technical Solution

In order to solve the above-described problems, the invention disclosed in the present application has various aspects, and the summary of representative examples of the aspects is as follows.
(1) An expression-variable robot including: a simulated face; and an eyebrow body disposed on a surface of the simulated face, wherein the eyebrow body having, flexibility includes: a first support part an outer end of the eyebrow body; a second support part supporting an inner end of the eyebrow body; and a drive part configured to drive at least any one of the first support part or the second support part to rotate at least any one of the outer end or the inner end.
(2) The expression-variable robot of (1), wherein the second support part is installed to support the inner end such that the inner end is rotatable and movable upwards and downwards.
(3) The expression-variable robot of (1) or (2), wherein the simulated face has a slot that acts as a movement path of the inner end when the second support part is moved upwards and downwards, and the second support part has a surface extending to block the slot.
(4) The expression-variable robot of (3), wherein a groove formed to follow the upward/downward movement of the second support part is disposed around the slot on a rear surface of the stimulated face.
(5) The expression-variable robot of any one of (1) to (4), wherein at least any one of the outer end or the inner end of the eyebrow body is rotated such that the eyebrow body is elastically deformed so that a distance of the eyebrow body from the surface of the stimulated face is changed.

Advantageous Effects

According to aspects (1) to (5), an expression-variable robot capable of stably showing various kinds of expressions while having a simple configuration can be provided.

BRIEF DESCRIPTION OF THE DRAWINGS

FIG. 1 is an exploded perspective view of an expression-variable robot according to the present embodiment.

FIG. 2 is a block diagram illustrating an example of a system configuration of the expression-variable robot according to the present embodiment.

FIG. 3 is a front view illustrating an example of an expression in the expression-variable robot according to the present embodiment.

FIG. 4 is a front view illustrating an example of an expression in the expression-variable robot according to the present embodiment.

FIG. 5 is a front view illustrating an example of an expression in the expression-variable robot according to the present embodiment.

FIG. 6 is a front view illustrating an example of an expression in the expression-variable robot according to the present embodiment.

FIG. 7 is a front view illustrating an example of an expression in the expression-variable robot according to the present embodiment.

FIG. 8 is a front view illustrating an example of an expression in the expression-variable robot according to the present embodiment.

FIG. 9 is a top view of the expression-variable robot according to the present embodiment, when viewed from the top.

DETAILED DESCRIPTION OF THE EMBODIMENTS

Hereinafter, an embodiment of the present disclosure (hereinafter, also referred to as the present embodiment) will be described with reference to the accompanying drawings. In addition, the disclosure is merely a simple example, and those that may be easily conceived through proper changes in a state in which an ordinary person in the art maintains the main spirit of the present disclosure also fall within the scope of the present disclosure. Further, in order to describe the figures more clearly, the widths, the thicknesses, and the shapes of the parts may be schematically illustrated as compared with the actual aspects, but they are simple examples and do not limit the construction of the present disclosure. Furthermore, in the specification and the figures, the same elements as described in advance with reference to the above-mentioned drawings are denoted by die same reference numerals, and a description thereof may be properly omitted.

Further, in the figures, for example, the eyebrow body of the right side of the face (the left side in the figures) is expressed by "an eyebrow body 40a" with a reference numeral and the eyebrow body of the left side of the face (the right side in the figures) is expressed by "an eyebrow body 40b" with a reference numeral, but in the following description, they are expressed by "eyebrow bodies 40" when it is not necessary to particularly distinguish the left and right sides. This is the same in the configurations installed on both left and right sides of the face, in addition to the eyebrow bodies 40.

First, a summary of the entire configuration of the expression-variable robot 100 according to the present embodiment will be described with reference to FIG. 1. FIG. 1 is an exploded perspective view of an expression-variable robot according to the present embodiment, and is a view showing a state in which a simulated face 10, a case 20, and an eyebrow body 40 are disassembled. Furthermore, in FIG. 1, a configuration that does not require a description in understanding the configuration of the present embodiment is properly simplified and illustrated.

The expression-variable robot 100 is a robot that imitates the head part of a person, and is a robot that allows the expression thereof to change by adopting the configuration for supporting an outer end 41 of the eyebrow body 40 having flexibility and supporting the outer end 41 such that the outer end 41 is rotatable, and for supporting an inner end 42 of the eyebrow body 40 such that the inner end 42 is rotatable and movable upwards and downwards.

As illustrated in FIG. 1, the expression-variable robot 100 has the simulated face 10 and a case 20 that constitutes a frame, and maintains simulated eyeballs, various mechanisms, a drive part, and the like. The simulated face 10 and the case 20 may be formed of a hard material such as a thermosetting resin.

A convex and concave portion is formed on a surface of the simulated face 10 so as to show various facial elements, such as a simulated nose, a simulated lip, and the like. The simulated face 10 may be fixed to the case 20 so as to cover an internal structure maintained in the case 20. Further, the simulated face 10 has an outer end hole 11 for exposing a bearing part 51 described below in a state of being fixed to the case 20, and an inner end hole 12 for exposing a bearing part 61 described below. The outer end hole 11 is a substantially circular hole, and the inner end hole 12 is a long hole (slot) extending upwards and downwards.

In addition, the expression-variable robot 100 has an eyebrow body 40 disposed on the surface of the simulated face 10. The eyebrow body 40 is a line-shaped member. Furthermore, the eyebrow body 40 has a body 43 disposed on the surface of the simulated face 10, an outer end 41 formed to be curved at one end of the body 43, and an inner end 42 formed to be curved at an opposite end of the body 43. The outer end 41 is disposed at a portion corresponding to an eyebrow ending portion of the stimulated face 10, and the inner end 42 is disposed at a portion corresponding to an eyebrow starting portion of the simulated face 10. Further, the body 43 is a portion corresponding to an eyebrow curved portion.

At least the body 43 of the eyebrow body 40 may be formed of a material that has flexibility and is elastically deformable. The outer end 41 and the inner end 42 may be formed of a metal or the like as a separate body from the body 43, and may be formed of a flexible member integrally formed with the body 43 and may be formed by coating a metal or the like onto the flexible member.

Further, the expression-variable robot 100 has a first support part 50 supporting the outer end 41 of the eyebrow body 40 and a second support part 60 supporting the inner end 42 of the eyebrow body 40.

In the present embodiment, the first support part 50 is installed in the case 20, and has a bearing part 51 supporting the outer end 41 of the eyebrow body 40 so as to be rotatable in direction R1 in the figures. In the bearing part 51, a rotation hole 52 is formed, in which the outer end 41 is press-fitted through an outer end hole 11 formed in the simulated face 10

Furthermore, in the present embodiment, the second support part 60 is mounted on the case 20 so as to be movable in the direction R3 in the figures. Further, the second support part 60 has a bearing part 61 supporting the inner end 42 of the eyebrow body 40 so as to be rotatable in the direction R2 in the figures. In the bearing part 61, a rotation hole 62 is formed, in which the inner end 42 is press-fitted through an inner end hole 12 formed in the simulated face 10. Further, the second support part 60 does not need to be moved linearly upwards and downwards, and is sufficient if it is a configuration of allowing the rotation hole 62 to move upwards and downwards at least in a front view. In the present embodiment, the second support part 60 is rotated to follow the curved surface of the simulated face 10, and accordingly, the rotation hole 62 is configured to be moved upwards and downwards.

The inner end 42 press-fitted in the rotation hole 62 is moved while the inner end hole 12 formed in the simulated face 10 is taken as a movement path as the second support part 60 is moved upwards and downwards. Further, the second support part 60 has a surface 65 that extends upwards and downwards to cover the inner end hole 12 on the rear side of the simulated face 10. The surface 65 may be formed of the same material and color as those of the simulated face 10. Consequently, in the simulated face 10, a peripheral area of the inner end hole 12 and the surface 65 that covers the inner end hole 12 on the rear side are viewed as if they were integrated, and thus the inner end hole 12 of the simulated face 10 becomes inconspicuous.

Furthermore, as illustrated in FIG. 1, the simulated face 10 may have a groove 15 formed so as to follow the upward/downward movement of the second support part 60 in the periphery of the inner end hole 12 within the rear surface thereof. The dotted line of FIG. 1 indicates the groove 15 that is projected. Since the groove 15 is formed and the surface 65 of the second support part 60 is formed to be slid in the groove, the inner end 42 of the eyebrow body 40 may be smoothly moved upwards and downwards while the posture of the second support part 60 is made stable.

In addition, the above-described configurations are installed on the left side of the face (right side of the figure) and the right side of the face (left side of the figure) to be symmetrical around the center of the simulated face 10.

Next, a summary of the system configuration of the expression-variable robot according to the present embodiment will be described with reference to FIG. 2. FIG. 2 is a block diagram illustrating an example of a system configuration of the expression-variable robot according to the present embodiment.

As described above with reference to FIG. 1, the expression-variable robot 100 has a first support part 50, in which the bearing part 51 is installed, and a second support part 60, in which the bearing part 61 is installed. Further, as illustrated in FIG. 2, the expression-variable robot 100 may include a drive device 80 that drives the first support part 50 and the second support part 60. Further, a controller 90 that controls the drive device 80 may be installed outside the expression-variable robot 100.

The drive device 80 may be mounted in the interior of the case 20. Further, the drive device 80 includes a first drive part 81 that drives the bearing part 51 installed in the first support part 50, a second drive part 82 that rotates the bearing part 61 installed in the second support part 60, and a third drive part 83 that moves the second support part 60 upwards and downwards. Further, FIG. 2 illustrates only one configuration of the left side of the face or the right side of the face, but in the drive device 80 illustrated in FIG. 2, a configuration of driving the first support part 50a and the second support part 60a that support the eyebrow body 40a on the right side of the face, and a configuration of driving the first support part 50b and the second support part 60b that support the eyebrow body 40b on the left side of the face may be installed independently from each other.

Further, the drive parts included in the drive device 80, for example, may be servo motors available on the market. The servo motors may be connected to the controller 90 by wire or wirelessly so that the operations thereof may be controlled by manipulating the controller 90 by a user. Further, a configuration of automatically controlling the operations of the drive parts by using a sensor or the like may be possible.

Furthermore, examples of expressions shown by the expression-variable robot 100 according to the present embodiment will be described with reference to FIGS. 1 to 8. FIGS. 3 to 8 are front views illustrating examples of expressions in the expression-variable robot according to the present embodiment. FIG. 4 is a front view illustrating an example of an expression in the expression-variable robot according to the present embodiment. FIG. 5 is a front view illustrating an example of an expression in the expression-variable robot according to the present embodiment. FIG. 6 is a front view illustrating an example of an expression in the expression-variable robot according to the present embodiment. FIG. 7 is a front view illustrating an example of an expression in the expression-variable robot according to the present embodiment. FIG. 8 is a front view illustrating an example of an expression in the expression-variable robot according, to the present embodiment. Further, because the rotation hole 52, the outer end 41 press-fitted in the rotation hole 52, the rotation hole 62, and the inner end 42 press-fitted in the rotation hole 62 are hidden by the body 43 of the eyebrow body 40 when viewed from the front side, the illustrations thereof are omitted in FIGS. 3 to 8.

Because the driving of the first drive part 81 is controlled by the controller 90, the beaming part 51 installed in the first support part 50 is rotated. Accordingly, the outer end 41 of the eyebrow body 40 press-fitted in the rotation hole 52 formed in the bearing part 51 is rotated in the direction R1 of FIG. 1. Further, as the outer end 41 is rotated, the eyebrow body 40 having flexibility is elastically deformed. Further, in FIGS. 3 to 8, the clockwise direction in the figures is denoted by R11 and the counterclockwise direction is denoted by R12.

Further, because the driving of the second drive part 82 is controlled by the controller 90, the bearing part installed in the second support part 60 is rotated. Accordingly, the inner end 42 of the eyebrow body 40 press-fitted in the rotation hole 62 formed in the bearing part 61 is rotated in direction R2 of FIG. 1. Further, as the inner end 42 is rotated, the eyebrow body 40 having flexibility is elastically deformed. Further, in FIGS. 3 to 8, the clockwise direction in the figures is denoted by R21 and the counterclockwise direction is denoted by R22.

Further, because the driving of the third drive part 83 is controlled by the controller 90, the second support part 60 is moved upwards and downwards. Accordingly, the inner end 42 of the eyebrow body 40 press-fitted in the rotation hole 61 formed in the bearing part 61 is moved upwards and downwards in the direction R3 of FIG. 1. Further, as the inner end 42 is moved upwards and downwards, the eyebrow body 40 having flexibility is elastically deformed. Furthermore, in FIGS. 3 to 8, the upward direction in the figures is denoted by R31 and the downward direction is denoted by R32.

FIG. 3 illustrates a state in which in the right side of the face, the outer end 41a is rotated in the counterclockwise direction R12 and the inner end 42a is moved in the upward direction R31 and at the same time, is rotated in the clockwise direction R21. Further, in the left side of the face, the outer end 41b is rotated in the clockwise direction R11 and the inner end 42b is moved in the upward direction R31 and at the same time, is rotated in the counterclockwise direction R22. In this state, the eyebrow body 40a and the eyebrow body 40b are shaped as if the entire eyebrows drew a large crescent moon-shaped arc as a whole, and the expression-variable robot 100 shows a cheerful expression.

FIG. 4 illustrates a state in which in the right side of the face, the outer end 41a is rotated in the counterclockwise direction R12 and the inner end 42a is moved in the downward direction R32, and at the same time, is rotated in the counterclockwise direction R22. Further, in the left side of the face the outer end 41b is rotated in the clockwise direction R11 and the inner end 42b is moved in the downward direction R32 and at the same time, is rotated in the clockwise direction R21. In this state, the eyebrow body 40a and the eyebrow body 40b are substantially S-shaped and are shaped as if the face were frowned and the eyebrow curved portion is pulled up, and the expression-variable robot 100 shows an angry expression.

FIG. 5 illustrates a state in Which in the right side of the face, the outer end 41a is rotated in the clockwise direction R11, and the inner end 42a is moved in the upward direction R31 and at the same time, is rotated in the counterclockwise direction R22. Further, in the left side of the face, the outer end 41b is rotated in the counterclockwise direction R12, and the inner end 42b is moved in the upward direction R31 and at the same time, is rotated in the clockwise direction R21. In this state, the eyebrow body 40a and the eyebrow body 40b are shaped as if the face were frowned across the eyebrow ending portion, and the expression-variable robot 100 shows a sad expression.

FIG. 6 illustrates a state in Which in the right side of the face, the outer end 41a is rotated in the counterclockwise direction R12, and at the same time, the inner end 42a is moved in the downward direction R32. Further, in the left side of the face, the outer end 41b is rotated in the clockwise direction R11, and at the same time, the inner end 42b is moved in the downward direction R32. In this state, the eyebrow body 40a and the eyebrow body 40b are shaped as if they are pulled up straightly from the eyebrow starting portion across the eyebrow curved portion, and the expression-variable robot 100 shows a dignified expression.

FIG. 7 illustrates a state in Which in the right side of the face, the outer end 41a is rotated in the counterclockwise direction R12, and at the same time, the inner end 42a is rotated in the counterclockwise direction R22. Further, in the left side of the face, the outer end 41b is rotated in the clockwise direction R11, and the inner end 42b is rotated in the clockwise direction R21. In this state, the eyebrow body 40a and the eyebrow body 40b are smoothly S-shaped as compared with FIG. 4, and the expression-variable robot 100 shows a rather dubious expression.

FIGS. 3 to 7 illustrate the examples in which the shapes of the eyebrow bodies 40a and 40b are deformed such that the eyebrow bodies 40a and 40b are symmetrical in the leftward/rightward direction, without being limited thereto. That is, the eyebrow body 40a and the eyebrow body 40b may allow the shape to deform so as to be asymmetrical. FIG. 8 illustrates an example in which the right side of the face has the same shape as the eyebrow body 40a illustrated in FIG. 7 and the left side of the face has the same shape as the eyebrow body 40b illustrated in FIG. 4. In detail, in the right side of the face, the outer end 41a is rotated in the counterclockwise direction R12, and at the same time, the inner end 42a is rotated in the counterclockwise direction R22. Meanwhile, in the left side of the face, the outer end 41b is rotated in the clockwise direction R11, and at the same time, the inner end 42b is moved in the downward direction R32 and rotated in the clockwise direction R21.

FIG. 9 is a top view of the expression-variable robot according to the present embodiment, when viewed from the upper side. Since the eyebrow body 40 is elastically deformed but is not elongated, the length is always constant. Meanwhile, as at least any one of the outer end 41 or the inner end 42 is rotated, the length in a front view is different in a state in which the eyebrow body 40 is distorted to be elastically deformed and in a state in which the eyebrow body 40 is neither elastically deformed nor distorted. That is, the length in a front view is shorter in the state of being not distorted to be elastically deformed than in the state of being distorted. Accordingly, in the present embodiment, the length of the eyebrow body 40 is taken as the length at which the body 43 is separated from the surface of the stimulated face 10 in the state in which the eyebrow body 40 is not distorted. FIG. 9 illustrates a state in which the eyebrow body 40a is not distorted. Meanwhile, FIG. 9 illustrates a state in which the eyebrow body 40b is distorted. In this way, in the present embodiment, the eyebrow body 40 is elastically deformed such that the distance from the surface of the simulated face 10 is changed as at least one of the outer end 41 or the inner end 42 is rotated.

In the present embodiment, as described above, the expression may be changed by driving, the first support part 50 and the second support part 60 to elastically deform the shape of the body 43 of the eyebrow body 40. Further, because the control of the operation of the eyebrow body 40 is simple, the reproduction degree of the expressions is high and various kinds of expressions may be shown. Further, because the configuration of the robot is simple, it can be easily mass-produced. Further, the present embodiment is not limited to the expressions illustrated in FIGS. 3 to 8, and can show various expressions through various combinations of the rotational angles or the rotation directions of the outer ends 41a and 41b, the rotational angles or the rotation directions of the inner ends 42a and 42b, and the upward/downward movement amounts and the movement directions of the inner ends 42a and 42b. That is, the expression-variable robot 100 according to the present embodiment can simply express joy, anger, sorrow, and pleasure but express a delicate change in expression, and thus can realize rich expressions that are close to those of human beings more realistically.

Moreover, the configuration in which the outer end 41 is rotatable and the inner end 42 is movable upwards and downwards while being rotatable is illustrated in the present embodiment, without being limited thereto. It may be a configuration for changing the expression by elastically deforming the eyebrow body 40 and may be a configuration in which at least any one of the outer end 41 or the inner end 42 is supported to be rotatable.

Further, the present embodiment illustrates the expression-variable robot 100 actually imitates the head of a person, but the present disclosure is not limited thereto, and may imitate the head of an animal or an animation character as well. Furthermore, the shape, the thickness, and the length of the eyebrow body 40 are not limited to those illustrated. Further, the entire part or a portion of the eyebrow body 40 may be colored with a block color.

Further, the present embodiment illustrates the expression-variable robot 100, the expression of which is changed by elastically deforming the eyebrow body 40, but a function of driving eyeballs, the edges of eyelids, and the neck may be additionally provided. Due to this, it is possible to form richer expressions.

DESCRIPTION OF REFERENCE NUMERALS

(10) simulated face, (11) outer end hole, (12) inner end hole, (15) groove, (20) case (40) eyebrow body, (41) outer end (42) inner end, (43) body (50) first support part, (51) bearing part, (52) rotation hole, (60) second support part, (61) bearing part, (62) rotation hole, (65) surface, (80) drive device, (81) first drive part, (82) second drive part, (83) third drive part, (90) controller

The invention claimed is:

1. An expression-variable robot comprising:
a simulated face;
an eyebrow body disposed on a surface of the simulated face and having flexibility,
a first support part supporting an outer end of the eyebrow body;
a second support part supporting an inner end of the eyebrow body; and
a drive part configured to drive the first support part and the second support part to rotate the outer end and the inner end,
wherein the outer end of the eyebrow body curves towards a side of the simulated face and is supported by the first support part,
wherein the inner end of the eyebrow body curves towards a front of the simulated face and is supported by the second support part, and
wherein the second support part is movable upwards and downwards.

2. The expression-variable robot of claim 1, wherein the second support part is installed to support the inner end such that the inner end is rotatable and movable upwards and downwards.

3. The expression-variable robot of claim 1, wherein the simulated face has a slot that acts as a movement path of the inner end when the second support part is moved upwards and downwards, and the second support part has a surface extending to cover the slot.

4. The expression-variable robot of claim 3, wherein a groove formed to follow the upward/downward movement of the second support part is disposed around the slot on a rear surface of the simulated face.

5. The expression-variable robot of claim 1, wherein at least any one of the outer end or the inner end of the eyebrow body is rotated such that the eyebrow body is elastically deformed so that a distance of the eyebrow body from the surface of the simulated face is changed.

* * * * *